(12) United States Patent
Mathur et al.

(10) Patent No.: US 11,921,793 B2
(45) Date of Patent: *Mar. 5, 2024

(54) GRAPH BASED RECOMMENDATION SYSTEM

(71) Applicant: Neo4j Sweden AB, San Mateo, CA (US)

(72) Inventors: Navneet Mathur, Mountain View, CA (US); Nir Avrahamov, San Francisco, CA (US)

(73) Assignee: Neo4j Sweden AB, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,517

(22) Filed: Nov. 7, 2022

(65) Prior Publication Data

US 2023/0081880 A1     Mar. 16, 2023

Related U.S. Application Data

(63) Continuation of application No. 16/874,602, filed on May 14, 2020, now Pat. No. 11,537,663.

(60) Provisional application No. 62/893,577, filed on Aug. 29, 2019.

(51) Int. Cl.
| | | |
|---|---|---|
| *G06F 16/00* | (2019.01) | |
| *G06F 9/54* | (2006.01) | |
| *G06F 16/532* | (2019.01) | |
| *G06F 16/901* | (2019.01) | |
| *G06F 16/903* | (2019.01) | |
| *G06F 16/9032* | (2019.01) | |
| *G06F 16/9035* | (2019.01) | |
| *G06F 16/9038* | (2019.01) | |

(52) U.S. Cl.
CPC ......... *G06F 16/9035* (2019.01); *G06F 9/547* (2013.01); *G06F 16/532* (2019.01); *G06F 16/9024* (2019.01); *G06F 16/90328* (2019.01); *G06F 16/90339* (2019.01); *G06F 16/9038* (2019.01)

(58) Field of Classification Search
CPC ..................................................... G06F 16/532
See application file for complete search history.

(56) References Cited

U.S. PATENT DOCUMENTS

2019/0196890 A1    6/2019   Bucchi

OTHER PUBLICATIONS

Michael Bachman. Real-Time Recommendations and the Future of Search. Slides from Nov. 2015 presentation.
YouTube video dated Nov. 19, 2015 screenshot at https://youtu.be/L-GdmyswaFU.

*Primary Examiner* — Ajith Jacob
(74) *Attorney, Agent, or Firm* — Van Pelt, Yi & James LLP

(57) ABSTRACT

Techniques are disclosed to provide a graph based recommendation system. A recommendation engine definition that includes for each of a plurality of pipeline phases a corresponding phase definition and data indicating a location of the phase in a pipeline defined by the recommendation engine definition is stored in a memory of other storage device. The recommendation engine definition is used to generate programmatically one or more procedures to provide a recommendation engine that implements the pipeline. An API usable by a client to obtain a recommendation from the recommendation engine is generated programmatically and exposed.

22 Claims, 7 Drawing Sheets

GRAPH BASED RECOMMENDATION SYSTEM

CROSS REFERENCE TO OTHER APPLICATIONS

This application is a continuation of U.S. patent application Ser. No. 16/874,602, entitled GRAPH BASED RECOMMENDATION SYSTEM filed May 14, 2020, which claims priority to U.S. Provisional Patent Application No. 62/893,577 entitled GRAPH BASED RECOMMENDATION SYSTEM filed Aug. 29, 2019, both of which are incorporated herein by reference for all purposes.

BACKGROUND OF THE INVENTION

Personalized and situational recommendations (e.g., recommendations, suggestions, predictions) are used today in a wide spectrum of consumer and business applications including ecommerce, social networks, travel, entertainment, financial services, logistics, manufacturing, marketing, customer success and human resources.

Recommendation systems may be used by companies to personalize user experiences to improve customer loyalty, help staff to make effective and impactful decisions, drive efficiency across enterprise workflows, and increase revenues and eliminate costs. Recommendations give users a personalized experience that supports the context and objectives of their current workflow, takes non-linear paths through an application to suggest products or choices they might not otherwise have become aware of and considered, and enforces enterprise strategies individualized for each persona and context.

Database systems, including graph databases, have been used to provide recommendations, but typically a developer or consultant with advanced skills is required to provide a recommendation engine for a particular purpose, and typically such a system employs only one method (e.g., algorithm) to determine recommendations, while in the real world one solution may not meet all needs.

BRIEF DESCRIPTION OF THE DRAWINGS

Various embodiments of the invention are disclosed in the following detailed description and the accompanying drawings.

DETAILED DESCRIPTION

Figure 1:
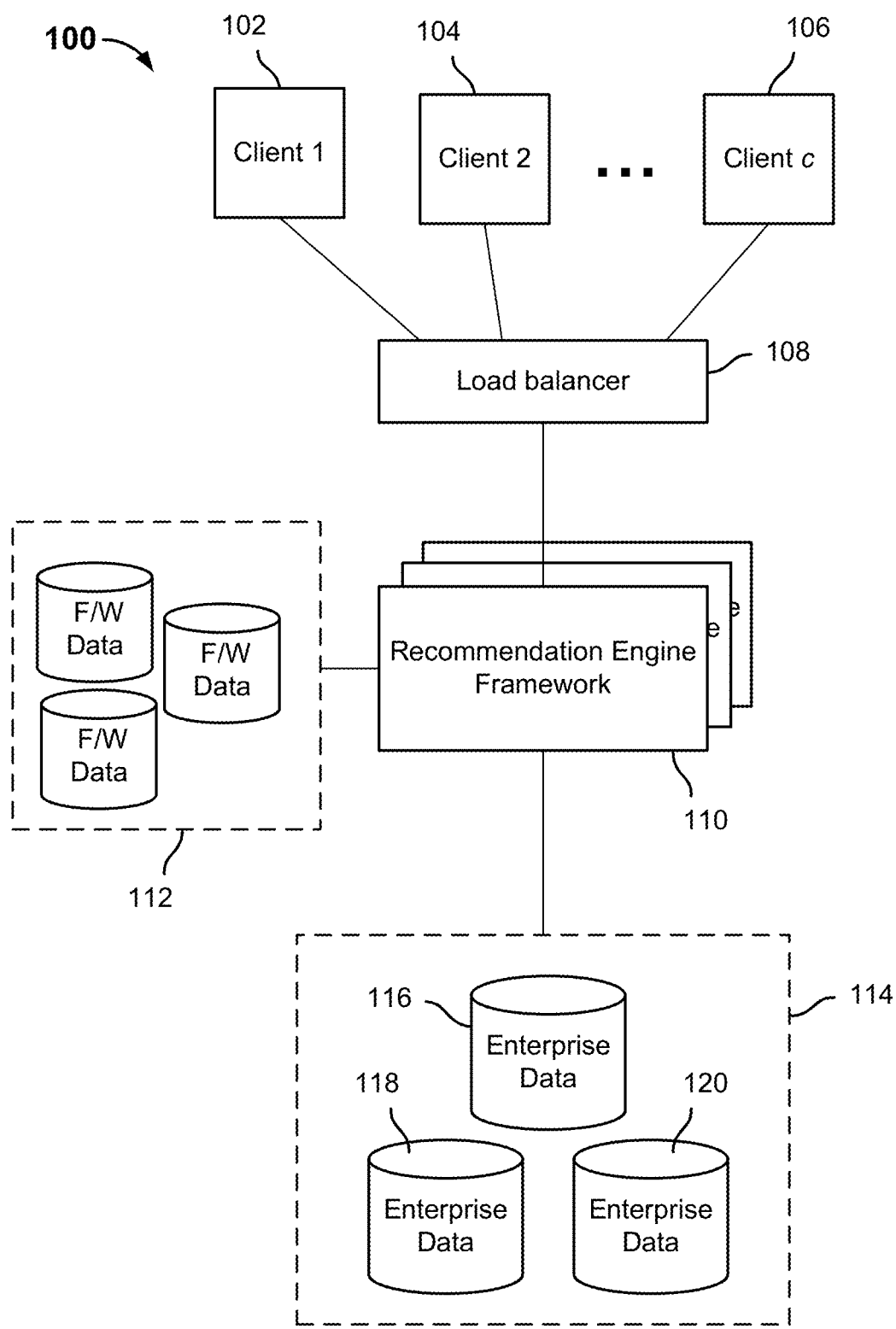
FIG. 1 is a block diagram illustrating an embodiment of a graph-based recommendation system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A graph based recommendation system and framework is disclosed. In various embodiments, a data model agnostic tool is provided to help recommendation providers design and manage graph-based recommender systems. In some embodiments, an admin console allows users to build out a recommendation pipeline. Code to implement the pipeline and expose a GraphQL API where recommendations can be accessed are generated programmatically.

In various embodiments, a recommendation set includes a list of score item pairs, and an additional optional details field object. In some embodiments, both the item and detail fields object can be any type supported by the database and a score must be a numerical type. The recommendation set is accumulated and scored using a Cypher-based recommendation engine, built on top of a graph-based database system and/or solution.

In various embodiments, a recommendation engine is defined and implemented as a pipeline composed of different steps, sometimes called phases, which takes as input an arbitrary JSON object and produces a list of scored recommendations. The engine has a connection to a graph database from which potential recommendations are discovered using a variety of recommendation generation algorithms and techniques. In various embodiments, a system as disclosed herein is data model agnostic and can connect to any number of existing graph databases simply by providing the database URL and credentials.

In various embodiments, each phase in the engine pipeline is defined using a declarative language, such as the Cypher query language. There are multiple execution modes, including server-side execution, where all phases are compiled into a single cypher statement and executed at once; sequential execution, where each phase is executed independently one after another; and selective execution, where pre-selected phases are either compiled into a single cypher statement and executed at once or sequentially executed.

FIG. 1 is a block diagram illustrating an embodiment of a graph-based recommendation system. In the example shown, recommendation system and environment 100 includes a plurality of clients, represented in FIG. 1 by clients 102, 104, and 106, configured to connect via a load balancer 108 to a recommendation engine framework 110. For example, instances of recommendation engine framework 110 configured to support requests from clients 102, 104, 106, may be deployed at each of a plurality of servers, and load balancer 108 may, for each request from a client 102, 104, 106, determine a corresponding instance of recommendation engine framework 110 to service the request.

Examples of clients 102, 104, 106 include without limitation client websites and/or applications running on mobile devices, desktop or laptop computers, and any other client device configured to obtain and display or otherwise use recommendations provided by a recommendation system as disclosed herein. In various embodiments, clients 102, 104, 106 are configured to submit requests via a GraphQL or other API generated and exposed automatically as disclosed herein.

Referring further to FIG. 1, in the example shown one or multiple instances of a recommendation engine framework 110 use(s) framework data 112 to provide recommendations based on customer/user data stored in a data cluster 114. Examples of framework data 112 include without limitation configuration data, recommendation pipeline/engine definitions, user profile data, user session data, recommendation-related statistics, and other recommendation engine data and metadata. In the example shown, data cluster 114 includes three databases and/or database systems 116, 118, 120, but in various embodiments recommendation engine framework 110 may be configured to connect to any number of graph-based data sources. While in FIG. 1 framework data 112 and customer/user data 114 are shown as separate database clusters, in some embodiments framework data 112 and customer/user data 114 are logically separate databases stored on the same database cluster/system.

In some embodiments and contexts, recommendation engine framework 110 may have an active connection, e.g. via the internet, to a remotely hosted data cluster 114. In some embodiments, in the absence of a connection to the internet, recommendation engine framework 110 may be connected—via a local network, directly, etc.—to a locally-stored data cluster 114 and/or to a locally-stored mirrored or cached full or partial copy of data stored in data cluster 114.

In various embodiments, recommendation engine framework 110 is configured via techniques disclosed herein to implement at graph-based recommendation engine. A user constructs a processing pipeline as disclosed herein to define a recommendation engine. For each phase of the pipeline, the user uses a declarative language, such as the Cypher graph query language, to define the data discovery and/or results set processing to be performed in that phase, as described further below. The user also provides database connection information and defines the data entities to be included in results sets. In various embodiments, recommendation engine framework 110 uses the pipeline definition to generate, programmatically without human programmer involvement, a procedure to implement the pipeline, and/or in some embodiments a pipelined set of phase-specific components or procedures, and a GraphQL or other API to be used by clients to access the recommendation engine.

In various embodiments, recommendation engine framework 110 implements a plurality of algorithms and techniques to generate recommendations. In some embodiments, an administrative and/or pipeline definition interface is provided via which a user may indicate which algorithms are to be used to generate recommendation results via a pipeline and/or one or more phases thereof. In some embodiments, the interface enables a user to assign weights to be assigned to results from various algorithms/approaches and/or set configuration values to inform how one or more such approaches are to be used.

In various embodiments, the recommendation engine framework 110 uses hybrid scoring to integrate recommendation results obtained via multiple methods, to provide results that best fit each user and/or situation (context) in real time. In various embodiments, recommendation engine framework 110 uses graph data science algorithms—including without limitation Similarity, Pathfinding, Centrality, Community Detection, and Link Prediction algorithms—for scoring and filtering recommendations. In various embodiments one or more of the following may be used: collaborative scoring methods based on similar users or products; content scoring methods based on user histories and profiles; rules-based scoring methods based on predefined rules and criteria; and strategy scoring methods based on promotions, margins, inventory and other business data.

Figure 2:
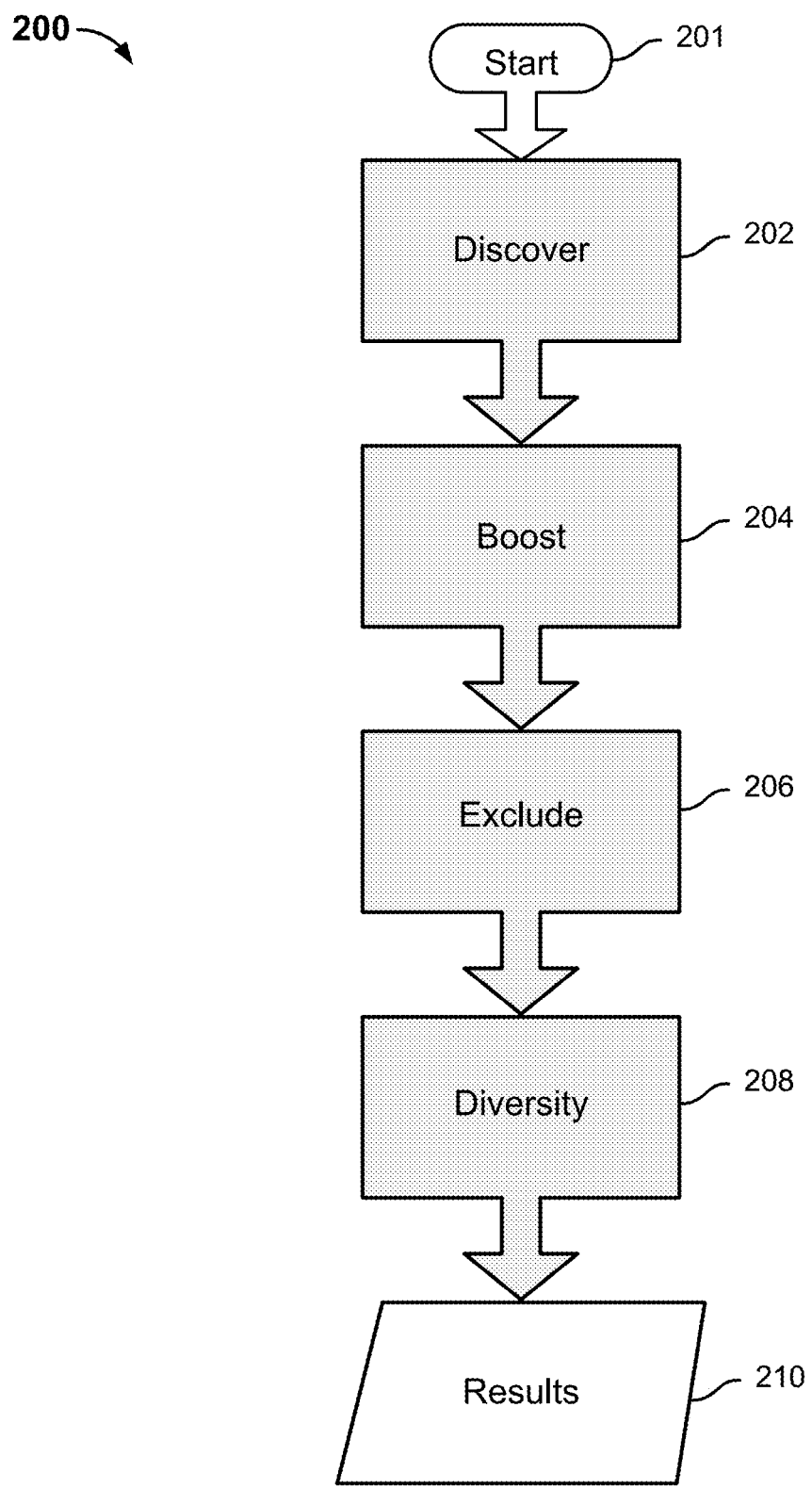
FIG. 2 is a diagram illustrating an example of a pipeline-based recommendation engine implemented by an embodiment of a graph-based recommendation system.

In various embodiments, graph machine learning algorithms may be implemented and used as follows to perform tasks and processing as indicated:

Pathfinding & Search
  Parallel Breadth First Search andDFS
  Shortest Path
  Single-Source Shortest Path All Pairs Shortest Path
    Minimum Spanning Tree
  A* Shortest Path
  Yen's K Shortest Path
  K-Spanning Tree MST
Centrality & Importance
  Degree Centrality
  Closeness Centrality Betweenness Centrality
  PageRank
  Harmonic Closeness Centrality
  Dangalchev Closeness Centrality
  Wasserman & Faust Closeness Centrality
  Approximate Between-ness Centrality
  Personalized PageRank
Community Detection
  Triangle Count
  Clustering Coefficients
  Connected Components Union Find
  Strongly Connected Components Label Propagation
  Louvain Modularity 1 Step
  Balanced Triad Identification
  Louvain Multi-Step
Similarity & Machine Learning Workflow
  Euclidean Distance
  Cosine Similarity Jaccard Similarity
  Random Walk
  One Hot Encoding FIG. 2 is a diagram illustrating an example of a pipeline-based recommendation engine implemented by an embodiment of a graph-based recommendation system. In various embodiments, the example pipeline 200 shown in FIG. 2 is defined via a recommendation definition user interface, as disclosed herein, see, e.g., FIG. 3 and accompanying description. In various embodiments, a graph-based recommendation engine is defined, generated, deployed, and run on a recommendation engine framework and associated components, such as recommendation engine framework 110 of FIG. 1.

In the example shown in FIG. 2, a recommendation that implements the pipeline 200 is activated by a stimulus labeled Start 201 in FIG. 2. In various embodiments, Start 201 may comprise a communication that triggers operation of the recommendation engine. In some embodiments, Start 201 comprises a communication (e.g., API call) that optionally includes one or more variables, such a data indicating user interaction with some content (e.g. page browsed to, item hovered over or selected, item selected, text entered, etc.) and/or other context data (user profile/demographic, business rule or policy data, etc.).

Referring further to FIG. 2, in the example shown the first phase is a Discover phase 202 used to obtain potential recommendations and in some embodiments to give each potential recommendation an initial score. Code to implement the Discover phase 202 in various embodiments uses one or more database connections associated with the pipeline 200 to access associated graph databases and perform graph database queries to obtain potential recommendations. The database connections may be defined by a user that defined the pipeline 200, or another authorized user. The queries performed by Discover phase 202 are defined by a user, e.g., by expressing the desired queries using a declarative language, such as the Cypher graph query language.

In various embodiments, the first phase in each recommendation engine must be a discovery phase, but additional discovery phases may be included later in the list. A discovery phase can be any arbitrary Cypher query which returns a list of records containing a recommendation composed of an item, score, and (optionally) a details field.

The pipeline 200 further includes a Boost phase 204. In various embodiments, a boost phase is used to modify the score of items previously discovered. A pipeline can have any number of boost phases. A boost phase is any arbitrary query which returns a single score value, which is in turn added to the existing score. Note that unlike Discover phase queries which are each run once, a Boost phase is run against each recommendation in the current list. The item in the current recommendation can be accessed from cypher using the keyword this.

The pipeline 200 also includes an Exclude phase 206. In various embodiments, an exclude phase is used to filter down the list of recommendations either by specifying which items to remove, or by specifying which items to keep and removing the rest. Like a boost phase, in various embodiments, an exclude phase is executed against each recommendation in the list and returns a single corresponding value for each. If the value is null then the recommendation is removed from the list. Exclude phases can also be inverted where only the null values remain.

The pipeline 200 further includes a Diversity phase 208. In various embodiments, a Diversity phase is used to ensure that the recommendations in the list are heterogeneous over a specified attribute. A limit is chosen for the maximum number of items included for each attribute, prioritizing items with the highest score. The phase then executes a query which returns a single attribute value for each recommendation in the list and then returns the value of the attribute for each item, removing any items beyond the set limit. In some embodiments, the items in the set of recommendations as processed in a preceding phase are passed into a Diversity phase, which returns a corresponding attribute for each item in the list. The top n items with each attribute are kept and the remaining items are removed from the list. The threshold n is defined within each specific Diversity phase.

The pipeline 200 provides as output a set of recommendation results 210. In various embodiments, a creator of the pipeline 200 uses a recommendation engine definition user interface to indicate the values, number of items, format, etc. of the results 210 to be returned in response to each request.

While in the example shown in FIG. 2 the pipeline 200 includes one each of a Discover phase 202, Boost phase 204, Exclude phase 206, and Diversity phase 208, in various embodiments a pipeline defined and implemented as disclosed herein may include at least one discovery phase and zero or more boost, exclude, and diversity phases. In some embodiments, a pipeline must begin with a discovery phase, but other phases may occur in any order as defined by a creator of a given pipeline.

In various embodiments, an administrative console and/or other user interface allows users to design and manage recommendation engines and database connections. The console may also have other useful development and monitoring features, including without limitation one or more of:

Database Connection monitoring—The system tracks which databases are up and running and can be reached by the framework. It provides relevant information such as the bolt connection address, how many engines are connected, and who has admin rights to change the database connection. Admin rights are granted by the individual creating the database connection, they also specify if this database connection is public or private. Public database connections can be used by any registered user to create an engine. database version and licenses, and ensures that all necessary plugins and procedures are present.

Active and Inactive Phases—The system allows the user to toggle the phases of an engine on and off in order to analyze the impact that each has on the results and performance of the engine.

Engine Monitoring—The system monitors all engines to indicate when an engine cannot connect to its database connection. The engine card on the admin UI also shows who has admin rights to change the engine. Admin rights are granted by the individual creating the engine, they also specify if this engine is public or private. Public engines can be seen and used by any registered user.

Performance Testing—The system's API provides lightweight performance testing capabilities where users can execute synchronous calls to an engine and track their execution times.

Figure 3:
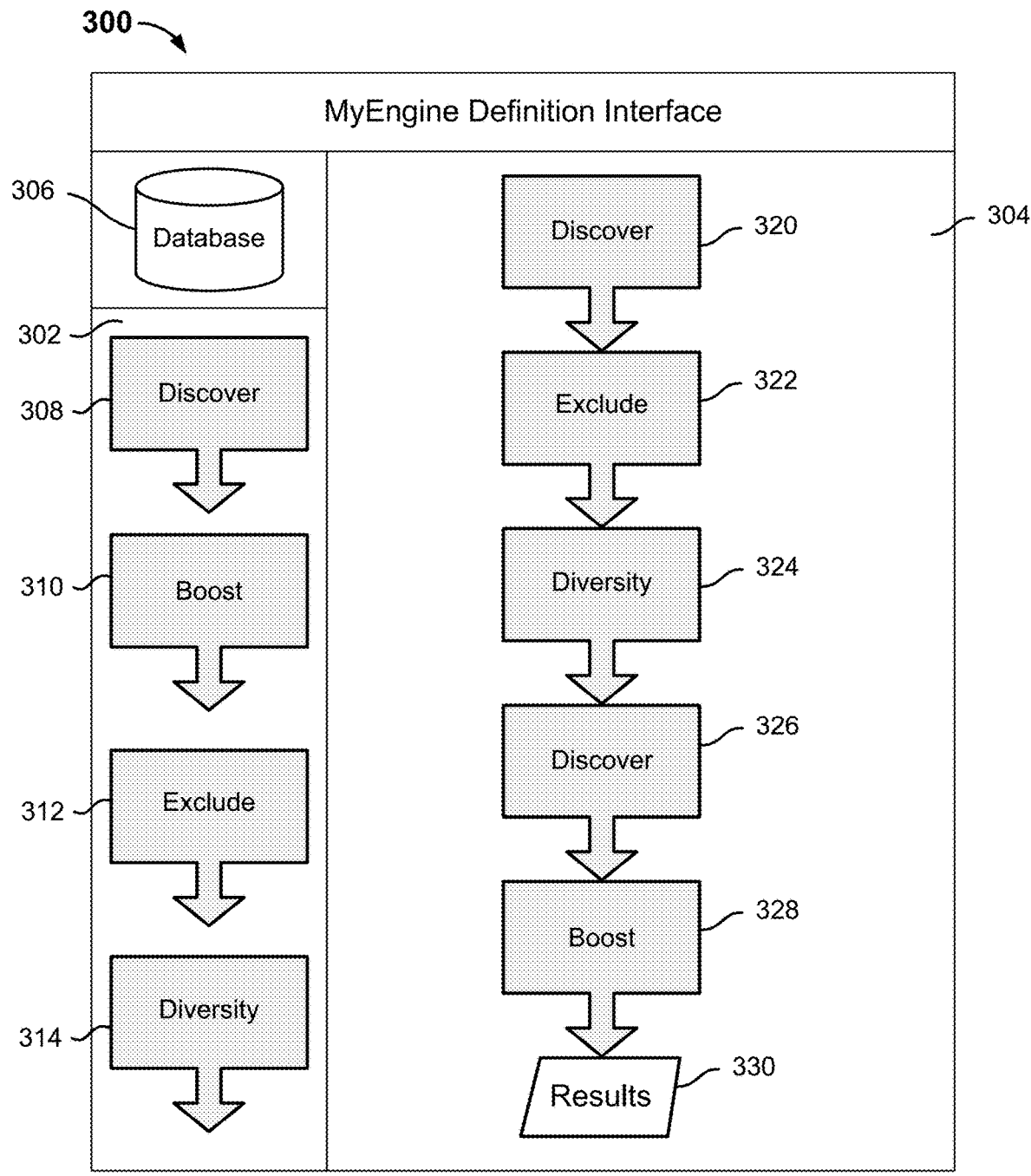
FIG. 3 is a diagram illustrating an example of a pipeline definition user interface in an embodiment of a graph-based recommendation system.

FIG. 3 is a diagram illustrating an example of a pipeline definition user interface in an embodiment of a graph-based recommendation system. In various embodiments, the pipeline definition user interface 300 may be associated with a recommendation engine framework, such as recommendation engine framework 110 of FIG. 1, and/or associated user interface components, such as a web-based interface, admin user client side software, etc. In some embodiments, an administrative user may use a web-based interface, such as interface 300 of FIG. 3, to define and/or redefine a recommendation engine pipeline. In some embodiments, an API may be used to access the same features as those described herein as being accessed via a web-based interface such as interface 300.

In the example shown, pipeline definition user interface 300 includes a pipeline component palette area 302 and a current project definition canvas area 304. The pipeline component palette area 302 displays user selectable and reusable building blocks that a user can drag and drop onto project definition canvas area 304 to be added to a pipeline being defined. In various embodiments, the user can rearrange, add, and remove blocks from project definition canvas area 304 as desired to define or redesign a recommendation engine.

User interface 300 includes an icon 306 and/or associated data representing an available set of one or more database connections available to be accessed by the pipeline being defined or re-defined.

In the example and state shown, the following reusable building blocks are displayed in pipeline component palette area 302: discover phase 308; boost phase 310; exclude phase 312; and diversity phase 314. A user selects (e.g., double click, drag/drop) a phase to be added to the pipeline. In some embodiments, instead of selecting items form a palette such as palette area 302 a user adds a phase by selecting a control labeled "+" or "add phase" or something similar, resulting in display of a pop up or other display from which the user selects or otherwise indicates the type of phase to be added.

In the example shown, a recommendation engine based on the following pipeline phases—in the order listed and as shown in FIG. 3—has been created by adding and arranging components in the project definition canvas area 304: Discover phase 320; Exclude phase 322; Diversity phase 324; a second Discover phase 326; a Boost phase 328; and Results 330. Note the pipeline as shown in FIG. 3 includes two Discover phases and the phases occur in a different order than the example pipeline 200 of FIG. 2.

Figure 4:
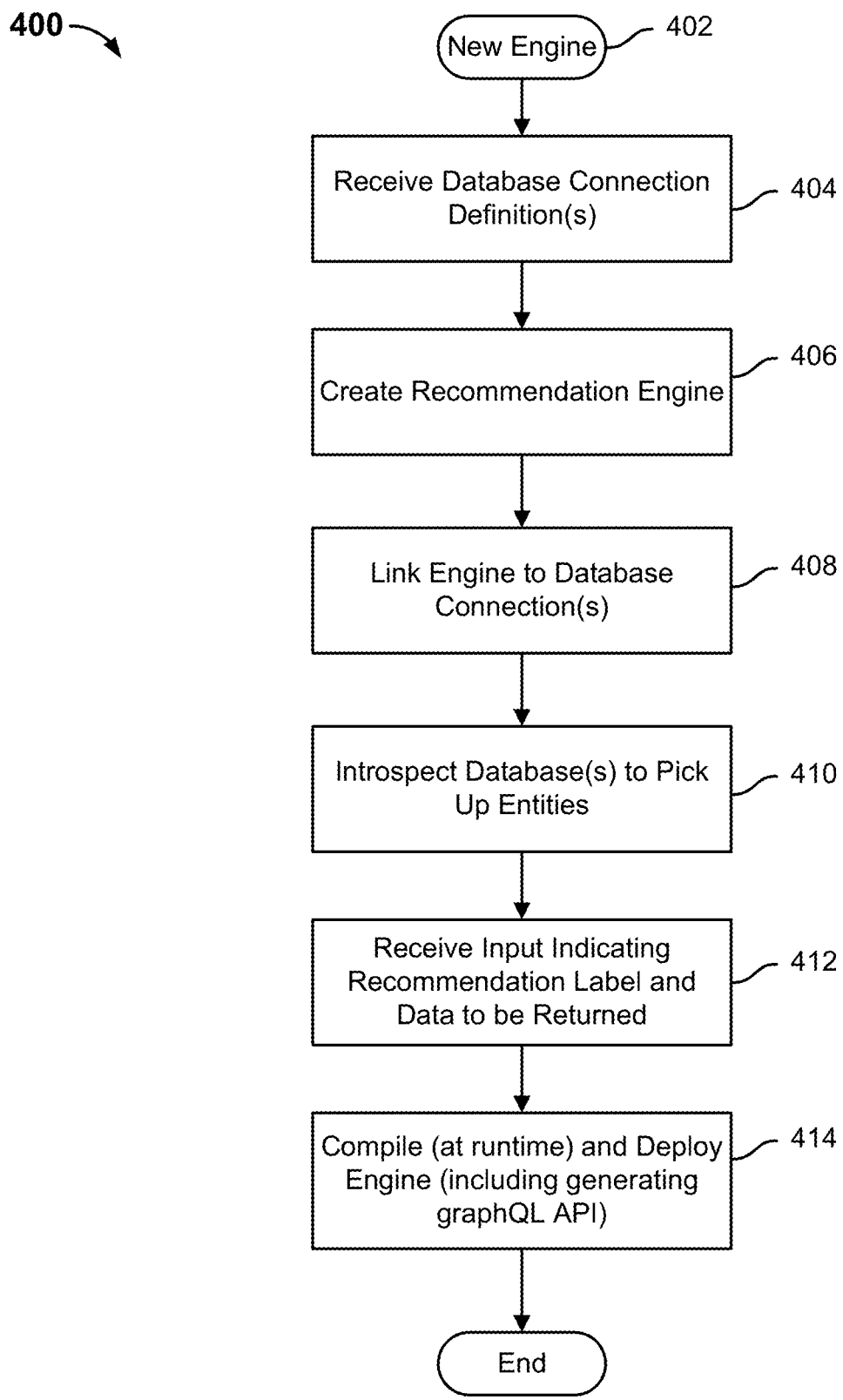
FIG. 4 is a flow chart illustrating an embodiment of a process to define and deploy a graph-based recommendation engine.

FIG. 4 is a flow chart illustrating an embodiment of a process to define and deploy a graph-based recommendation engine. In various embodiments, the process 400 of FIG. 4 is performed by a recommendation engine framework, such as such as recommendation engine framework 110 of FIG. 1, and/or associated components. In the example shown, an indication to create a new recommendation engine is received at 402. For example, a user may have selected a button or other user interface control or option to "create" a new engine. In various embodiments, a user is prompted to enter a name for the engine, an optional description, the name of a database connection(s) to be used, the node label to be returned by the engine, the id/primary key field for that node type, and all the fields the user would like to be returned for each recommendation. In some embodiments, all of the aforementioned fields except for name and description provide auto generated options for the user's convenience.

Referring further to FIG. 4, one or more database connection definition(s) to be used by the recommendation engine are received at 404. For example, new database connections may be defined and/or previously-defined connections selected. In some embodiments, for each database connection a user interface includes a database connection card that displays the status of the database (online or offline), the connection url/port, and the number of engines connected to it. If a database goes down or is deleted all the recommendation engines built on top of that database will become unavailable until the database is back online. When creating a new database connection the user is prompted to enter a name, connection URL, and the database credentials. If the database is up and the connection is created successfully the connection will be marked as "Online".

At 406, a new recommendation engine project and associated data structures are created. At 408, the user-designate database connection(s) is/are associated with the engine. The database(s) is/are introspected at 410 to pick up entities that exist in the respective databases, such as node labels, relations, etc. In some embodiments, the entities are displayed via a user interface, to facilitate user definition of pipeline phases. For example, the user may use the displayed information to define each phase of the pipeline. In some embodiments, the user selects (e.g., by double clicking) a phase as represented on a recommendation engine definition interface, such as project definition canvas area 304 of FIG. 3, which results in a phase definition interface (e.g., a pop-up window) being displayed. The phase definition interface includes a text entry area in which the user defines the processing to be performed for that phase using a declarative language, such as the Cypher graph query language.

The following are non-limiting examples of phase definitions, expressed as Cypher graph query language:

Discovery Phase to discover movies which others liked with a five star rating:
1 MATCH (m:Movie {title: $startMovieTitle})<-[:RATED5]-(:User)-[:RATED5]->(item:Movie)
2 RETURN item, 5 AS score, { } AS details LIMIT 100

Discovery Phase to discover movies which others liked with a four star rating:
1 MATCH (m:Movie {title: $startMovieTitle})<-[:RATED4]-(:User)-[:RATED4]->(item:Movie)
2 RETURN item, 4 AS score, { } AS details LIMIT 100

Exclude Phase to exclude movies which other users did not like:
1 MATCH (this)<-[:RATED5RATED4]-(:User)-[RATED1]->(item:Movie)
2 RETURN item Boost Phase to boost movies with the same critic rating:
1 MATCH (this)-[:HAS_RATING]->(r)<-[:HAS_RATING]-(:Movie {title:$startMovieTitle})
2 RETURN 5 AS score Diversity Phase to diversify based on genre, e.g., output a maximum of five movie recommendations per genre:
1 OPTIONAL MATCH (this)-[:HAS_GENRE]->(g)
2 WITH this, CASE WHEN exists(g.name) THEN g.name ELSE " " END AS attribute
3 RETURN attribute
Max amount: 5

At 412, user input indicating a node label and other data (e.g., data fields) to be returned for each recommendation is received. For example, for a movie recommendation engine, the system may suggest the entity/label "Movie" be returned, and may provide an interface to select this and/or other labels from the database to be returned. Similarly, the system may suggest properties (attributes) such as the movie "title", a URL to a poster or other image for the movie, a "plot" or "plot summary" attribute, etc. and may provide an interface to select these and/or other properties to be returned for each recommendation/result.

At 414, a recommendation engine based on the definition is compiled and deployed. In some embodiments, a recommendation engine is deployed in a two-step process. First, an engine shell is created. At runtime, then, the engine shell is opened and the pipeline is built within the shell. In various embodiments, the pipeline definition is read and used to generate a single procedure that implements the defined pipeline at runtime. In some alternative embodiments, a pipeline may be implemented as a set of phase-specific components that are invoked in the order indicated by the definition. In some embodiments, intermediate results are passed between pipeline phases in the form of a JSON or other object that is passed between them.

In various embodiments, a pipeline definition is used to compile and deploy an instance of a recommendation engine at runtime. In some embodiments, runtime variables and/or other context may be used to generate, initialize, and/or invoke the recommendation engine when compiled/deployed at runtime. In some embodiments, compiling the recommendation engine instance at runtime ensures the latest version of the pipeline definition and real-time input variables are used to generate the engine that is used at runtime.

Figure 5:
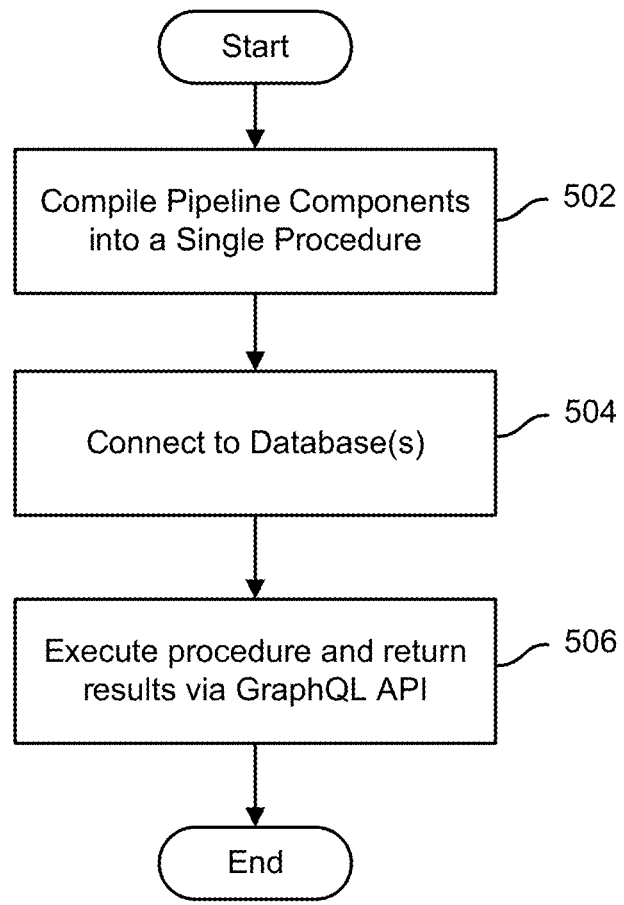
FIG. 5 is a flow chart illustrating an embodiment of a process to compile and deploy a graph-based recommendation engine at runtime.

FIG. 5 is a flow chart illustrating an embodiment of a process to compile and deploy a graph-based recommendation engine at runtime. In some embodiments, the process of FIG. 5 is performed to implement at least part of step 414 of FIG. 4. In the example shown, at 502 pipeline components (phases) are compiled into a single procedure and deployed to and executed on one or more recommendation engine framework instances, such as recommendation engine framework 110 of FIG. 1. At 504, the recommendation engine instances deployed at 502 establish connections to one or more databases, as defined in the associated recommendation engine definition.

At 506, the system auto-generates and exposes a GraphQL or other API to invoke (e.g., send recommendation requests to) the recommendation engine. In various embodiments, recommendations can be computed in two modes either incrementally where phases are run independently, or they can be precompiled into a single query and executed all at once, as in the example shown in FIG. 5. In some embodiments, the API generated and exposed at 506 can also be used to bypass the admin console and interact with the recommendation system directly.

Figure 6:
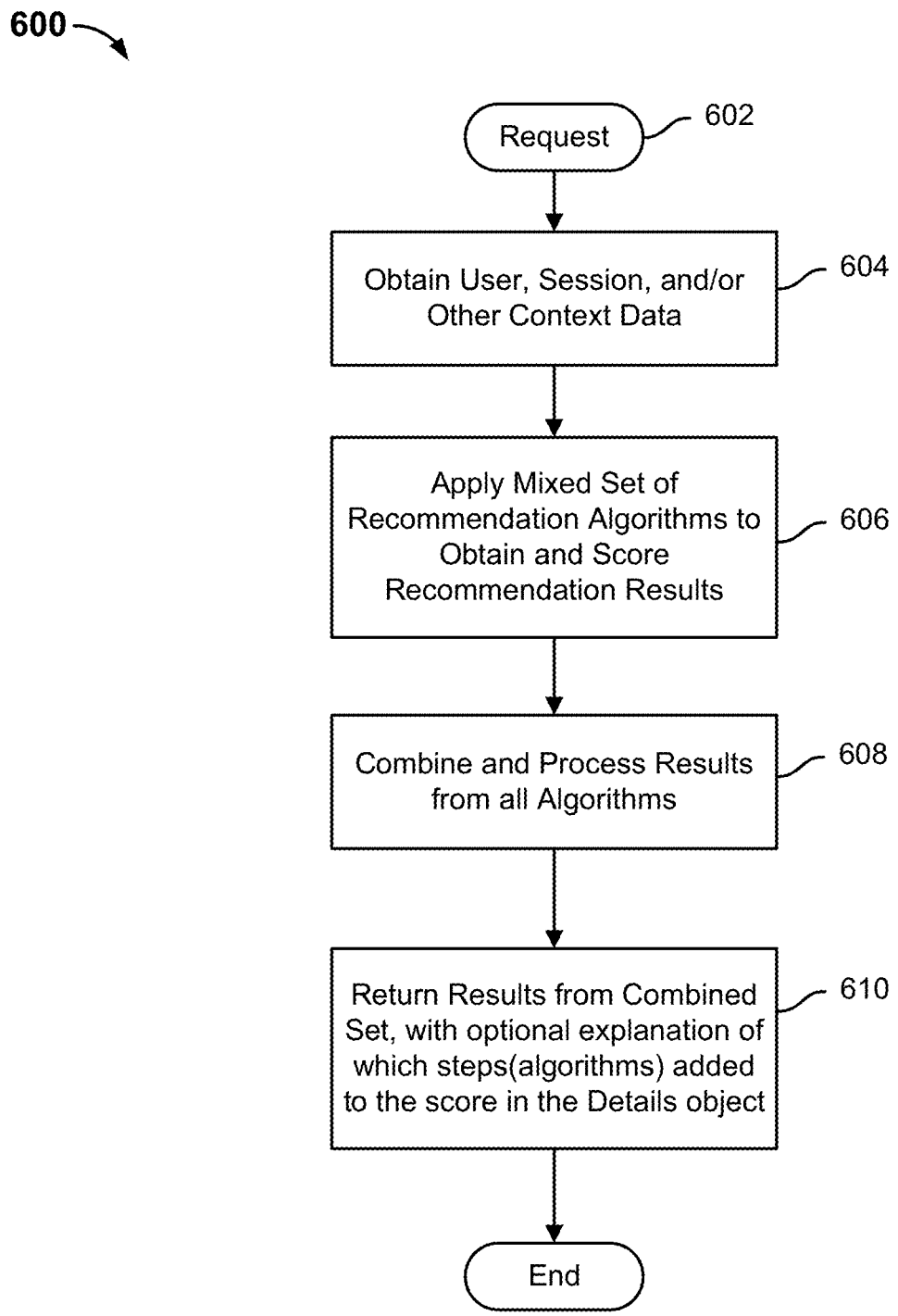
FIG. 6 is a flow chart illustrating an embodiment of a process to use a graph-based recommendation engine to provide a recommendation.

FIG. 6 is a flow chart illustrating an embodiment of a process to use a graph-based recommendation engine to provide a recommendation. In various embodiments, the process 600 of FIG. 6 may be performed by a recommendation engine instance, e.g., each time a request for recommendations is received, e.g., via a GraphQL or other API, as described above. In the example shown, a request is received at 602. At 604, user profile, user session, and/or other context data associated with the request is obtained/received. For example, user clickstream data and/or data associated with a user's current session with a site or service with which the request is associated may be received. Pages visited by the user, metrics of user consumption of and/or other interaction with specific assets comprising pages visited by the user, etc., may be received and used to determine a recommendation to be presented to the user. For example, results related to content the user has consumed recently may have their result score boosted in a boost phase of the search engine. Other context data not specific to a user may also be used. For example, business inventory data may be used to boost results associated with items for which excess inventory is held.

At 606, a mixed set of recommendation algorithms/methods/techniques are employed to generate a set of potential recommendations, and at 608 the results are combined and process to provide a consolidate set of results. Each item in the set has an item identifier and associated score, and optionally additional details, such as one or more fields of data associated with that item in the source database.

In prior systems, typically a single algorithm is used by the system, or if multiple methods are available only one is chosen at the outset to respond to a given request. In various embodiments, a graph-based system as disclosed herein generates results quickly enough to be able to use multiple techniques to generate results for a given request. In various embodiments, results generated by different techniques and a combined set of results, each item of which has an associated score, is determined. For example, a recommendation included in the results determined by multiple algorithms may be assigned a combined score that is higher than if only one algorithm had returned that item. In another example, user and/or other context data may be used, along with the results returned by each recommendation algorithm, to determine which results from which algorithms should be included in the combined set. In some embodiments, different algorithms and/or combinations of algorithms may be used in different phases of the pipeline, such as one set of algorithms being used in a first discovery phase in the pipeline with a different set of algorithms being used in a subsequent discovery phase that occurs later in the pipeline.

In the following example, different recommendation algorithms are invoked sequentially, but in some embodiments different recommendation algorithms are invoked in parallel. Similarly, in some embodiments, multiple pipeline phases may be invoked in parallel, e.g., different Discovery phases each accessing a different database connection and/or each configured to obtain different data (e.g., defined to perform different queries).

The following non-limiting example illustrates the use and integration of results from different recommendation generation algorithms/techniques, in various embodiments:

Example Request JSON:

```
query{
    recommendations(engineID:"Movies-CombinedEngine",param:{startMovieTitle:"Iron Man"},first:10){
        item
        score
        details
    }
}
```

The example Response JSON below shows the top 10 results determined using composite/combined algorithmic techniques. In this example, the output shows for each result the recommended movie along with its poster, plot, recommendation score and details object with score explainability information—showing which engine phase(s) contributed to the score and how each contributed. This output is displayed on the user interface as desired by the end user, in various embodiments.

Example Response JSON:

The following non-limiting example illustrates how different algorithms, strategies, and/or techniques, such as Collaborative, Content-based, Rule-based, and Business Strategy based techniques, may be used in combination in various embodiments to generate recommendations.

Collaborative—Discover movies based on user preference:
1 MATCH (m:Movie {title: $startMovieTitle})<-[:RATED5]-(:User)-[:RATED5]->(iL:Movie)
2 WITH COLLECT(DISTINCT i1) as item1,m
3 OPTIONAL MATCH(m)<-[:RATED4]-(:User)-[:RATED5RATED4]->(i2:Movie)
4 WITH item1+collect(DISTINCT i2) as i
5 UNWIND i as item
6 WITH DISTINCT item,5 as score
7 RETURN item,score,{DP1:{name:"Collaborative—Discover Movies Based on User Preference", score:score}} as details LIMIT 100

Content based—find movies with shared genres:
1 MATCH (start:Movie {title: $startMovieTitle})
2 MATCHp—(start)-[:HAS_GENRE]->(g:Genre)<-[:HAS_GENRE]-(item:Movie)
3 WITH DISTINCT item, count(p)*1.5 AS score
4 RETURN item, score
5 {DP2:{name:"Content based—Share Genres", score:score}} AS details Content based—discover movies with common actors:
1 MATCH (:Movie {title: $startMovieTitle}}<-[:ACTED_IN]-(a)-[:ACTED_IN]->(item:Movie)
2 WITH DISTINCT item, count(a) AS score
3 RETURN item, score
4 {DP3: {name:"Content based—Discover Movies with Common Actors", score:score}} AS details Rule—exclude movies that do not match the censor rating of the selected movie:
1 MATCH (start:Movie {title: $startMovieTitle})-[:HAS_RATING]->(:Rating)<-[:HAS_RATING]-(item)
2 RETURN item
Not Inverted Rule—boost movies with similar title:
1 MATCH (start:Movie {title: $startMovieTitle})
2 WITH this as item, apoc.text.sorensenDiceSimilarity(this.title, start.title)*10 AS score
3 RETURN item, score, {BP1:{name:"Rule—Boost on Similar Titles",score:score}} AS details Business strategy to promote highly rated Rotten Tomatoes™ movies in general:
1 MATCH (item:Movie)
2 WHERE item.rottenTomatoesRating IS NOT NULL
3 WITH item, item.rottenTomatoesRating/20 AS score
4 RETURN item, score. {DP4:{name:"Business Strategy—Movies with High Rotten Tomatoes Ratings", score:score}} AS details Collaborative phase to exclude movies based on user preference:
1 MATCH (this)<-[r]-(:User) WHERE type(r)="RATED4" or type(r)="RATED5"
2 RETURN this as item
Not Inverted Rule—diversify on genre:
1 OPTIONAL MATCH (this)-[:HAS_GENRE]->(g)
2 WITH this, CASE WHEN exists(g.name) THEN g.name ELSE " " END AS attribute
3 RETURN attribute
Max amount: 5

At 610, recommendation results from the combined set of recommendations are returned. For example, the top n results (e.g., by score or other ranking) in the combined set created at 608 may be returned to the requesting client.

In some embodiments, a recommendation engine as disclosed herein may be configured to generate and return "nested" recommendation results. For example, for at least a subset of results included in a results set, the system in some embodiments may perform a further set of operations to determine further recommendations associated with that item, and so on. Such an approach would enable the system to respond quickly to end user actions. For example, if items in the first recommendation results were displayed and the end user selected one, the system would be ready to quickly provide recommendations relating to the item the user selected.

In some embodiments, a recommendation system as disclosed herein captures at each of at least a subset of phases of a pipeline comprising a recommendation engine data reflecting for each of at least a subset of recommendation results and/or associated scores the pipeline phase at which that recommendation result was added to the recommendation set and/or at which the score or other data that resulted in the result being included in the final set of results returned to the client was determined. In various embodiments, the foregoing information is available to be accessed, e.g., by an administrative user, end user, or other user, via an administrative or other user interface, to provide an explanation of where results came from and why they ended up in the final set. Such information may be useful, for example, to evaluate which phase(s) of the pipeline are contributing most to producing and determining the final results.

In some embodiments, for example, a system as disclosed herein may be used to detect fraud. The framework generates a fraud risk score against an account or individual. The end user analyst looking at this output needs to understand all risk factors that generated the score. The details object can store each risk factor that comprised the score as it processes each step/phase corresponding to a risk factor.

In some embodiments, an administrative user interface enables a user to toggle individual phases of the pipeline on/off, e.g. to conduct testing to determine the impact the presence or absence of a given phase or set of phases has on the result produced by the recommendation engine.

Figure 7:
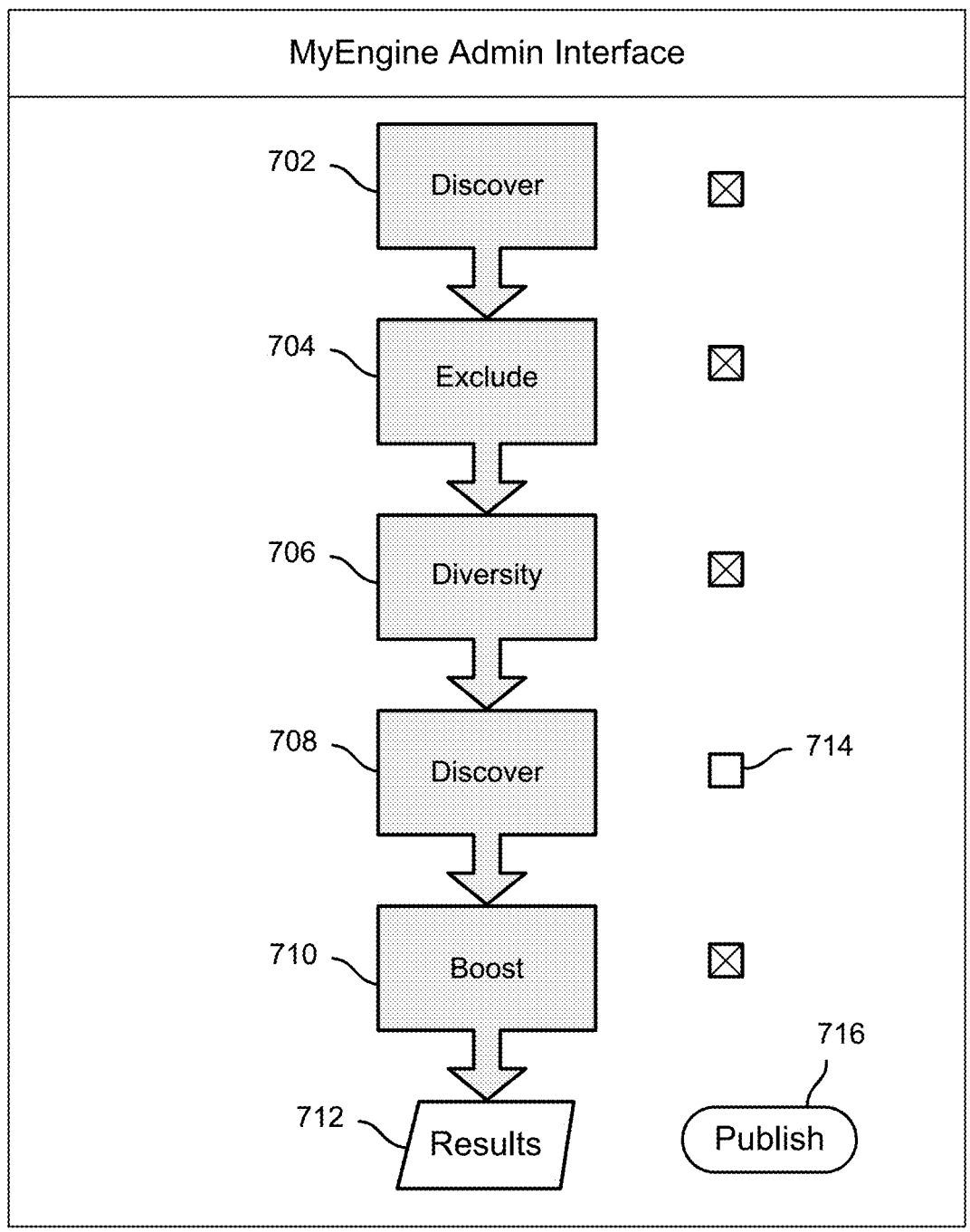
FIG. 7 is a diagram illustrating an example of an administrative console user interface provided in an embodiment of a recommendation system.

FIG. 7 is a diagram illustrating an example of an administrative console user interface provided in an embodiment of a recommendation system. In various embodiments, the user interface 700 of FIG. 7 may be used by an administrative user to monitor and control a recommendation engine. In the example shown, the user interface 700 displays a representation of a pipeline that includes the following phases in the order listed and shown: Discover phase 702, Exclude phase 704, Diversity phase 706, Discover phase 708, Boost phase 710, and Results 712. In this example, the user interface 700 further includes for each phase of the pipeline a corresponding check box displayed to the right of the phase. In the state shown, the check box 714 displayed to the right of Discover phase 708 is unchecked. In various embodiments, de-selection of the check box 714 (or any other check box) and selection of the "Publish" button 716 would cause new code to be generated for the associated recommendation engine which would omit the phase associated with the check box that has been unchecked, i.e., Discover phase 708 in the example shown in FIG. 7.

In various embodiments, a user interface and associated functionality as shown in FIG. 7 enables a relatively technically unsophisticated user to define and redefine a recommendation engine. The user can easily compare the recommendation results obtained and other aspects of performance (e.g., latency) between versions that include (or exclude) different combinations of phases.

In some embodiments, rules or other logic may be defined to automatically switch components one or off. For example, a user may want a phase to be included and performed only during certain seasons or periods (or excluded during such periods). Or, a user may want a phase to be omitted (or added) upon specified conditions or events, such as excess inventory, periods of high demand for recommendation results, etc.

In various embodiments, a client side application or website may be configured to call multiple recommendation engines in parallel with the same context information with each engine producing potentially different results depending on the business logic in the respective pipelines. Such an approach may be used, for example, where multiple recommendations are to be shown to the end user. For example, in movies scenario one engine can show popular movies and another engine can show similar movies.

In various embodiments, one or more administrative capabilities are supported. For example, in some embodiments, an administrative user interface provides a facility to define owners for each engine and database connection. Only owners can edit the respective engine and connections. In some embodiments, an administrative user interface provides a facility for the owner of the database or engine to define weather it is available to the public (e.g., available to all users of the associated recommendation engine framework instance) or only for their own private use. In some embodiments, an administrative user interface enables the number of engines deployed on a database to be managed. The user interface code keeps track of the number of engines deployed for each database on a database card and enforces the limit.

In various embodiments, techniques disclosed herein may be used to provide a recommendation system that takes advantage of graph database system capabilities to generate highly relevant results with high performance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory or other storage device configured to store a recommendation engine definition that includes for each of a plurality of pipeline phases a corresponding phase definition and data indicating a location of the phase in a pipeline defined by the recommendation engine definition, wherein at least one phase of the plurality of pipeline phases receives data and outputs a list of scored recommendations; and
   a processor coupled to the memory or other storage device and configured to:
      use the recommendation engine definition to generate one or more procedures to provide a recommendation engine that implements the pipeline; and
      generate and expose an Application Programming Interface (API) usable by a client to obtain a recommendation from the recommendation engine.

2. The system of claim 1, wherein the recommendation engine definition is defined via a recommendation engine definition user interface.

3. The system of claim 1, wherein the recommendation engine definition is defined via a recommendation engine definition Application Programming Interface (API).

4. The system of claim 1, wherein each of the corresponding phase definitions includes one or more actions expressed in a declarative language.

5. The system of claim 4, wherein the declarative language is the Cypher graph query language.

6. The system of claim 1, wherein each of the pipeline phases is associated with a corresponding pipeline phase type.

7. The system of claim 6, wherein each pipeline includes one or more discovery phases and one or more other phases.

8. The system of claim 7, wherein the other phases include one or more of a boost phase, an exclude phase, and a diversity phase.

9. The system of claim 1, wherein the pipeline may include an arbitrary number of pipeline phases in an arbitrary order.

10. The system of claim 9, wherein a selection and an order of pipeline phases is received via a recommendation engine definition interface.

11. The system of claim 1, wherein the processor is further configured to provide an administrative user interface that includes for each of at least a subset of the pipeline phases and corresponding control to toggle the phase on or off; and wherein the processor is further configured to regenerate and deploy the recommendation engine with the respective pipeline phases included or omitted as indicated by the state of the corresponding control associated with that pipeline phase.

12. The system of claim 1, wherein the processor is further configured to generate a recommendation engine that includes code to capture and report for each of at least a subset of recommendation results data that indicates one or more pipeline phases associated with including that result in the recommendation results.

13. The system of claim 1, wherein the processor is configured to generate a single procedure at runtime that implements a plurality of selected pipeline phases.

14. The system of claim 1, wherein the recommendation engine is configured to use a plurality of recommendation generation techniques to generate recommendation results in response to a recommendation request.

15. The system of claim 1, wherein the recommendation engine is configured to use context data to generate recommendation results in response to a recommendation request.

16. The system of claim 15, wherein the context data includes one or more of user profile data, business context data, and user session data.

17. The system of claim 1, wherein the recommendation engine definition is stored in a repository configured to enable an owner of the recommendation engine definition to control an extent to which the recommendation engine definition to be made available to other users.

18. The system of claim 1, wherein the recommendation engine definition comprises a first recommendation engine definition included in a plurality of recommendation engine definitions, the recommendation engine comprises a first recommendation engine, and the processor is further configured to use a second recommendation engine definition included in the plurality of recommendation engine definitions to provide a second recommendation engine, and wherein the processor is further configured to generate and expose one or more API's usable by the client to obtain a first recommendation from the first recommendation engine and a second recommendation from the second recommendation in parallel in response to a same request.

19. A method, comprising:
   storing in a memory or other storage device a recommendation engine definition that includes for each of a plurality of pipeline phases a corresponding phase definition and data indicating a location of the phase in a pipeline defined by the recommendation engine definition, wherein at least one phase of the plurality of pipeline phases receives data and outputs a list of scored recommendations;

using the recommendation engine definition to generate programmatically one or more procedures to provide a recommendation engine that implements the pipeline; and generating programmatically and exposing an Application Programming Interface (API) usable by a client to obtain a recommendation from the recommendation engine.

20. The method of claim 19, wherein each of the corresponding phase definitions includes one or more actions expressed in a declarative language.

21. The method of claim 19, wherein the recommendation engine includes code to capture and report for each of at least a subset of recommendation results data that indicates one or more pipeline phases associated with including that result in the recommendation results.

22. A computer program product embodied in a non-transitory computer readable medium and comprising computer instructions for:

storing in a memory or other storage device a recommendation engine definition that includes for each of a plurality of pipeline phases a corresponding phase definition and data indicating a location of the phase in a pipeline defined by the recommendation engine definition, wherein at least one phase of the plurality of pipeline phases receives data and outputs a list of scored recommendations;

using the recommendation engine definition to generate programmatically one or more procedures to provide a recommendation engine that implements the pipeline; and generating programmatically and exposing an Application Programming Interface (API) usable by a client to obtain a recommendation from the recommendation engine.

\* \* \* \* \*